US011025572B2

(12) United States Patent
Kuramochi et al.

(10) Patent No.: US 11,025,572 B2
(45) Date of Patent: Jun. 1, 2021

(54) ELECTRONIC MAIL DELIVERY SYSTEM HAVING A SPOOL FUNCTION

(71) Applicant: International Business Machines Corporation, Armonk, NY (US)

(72) Inventors: Kentaro Kuramochi, Yachiyo (JP); Shigeyuki Matsumoto, Yokohama (JP); Masatsugu Ohtsuka, Kawasaki (JP); Ichiro Takiguchi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 15/233,316

(22) Filed: Aug. 10, 2016

(65) Prior Publication Data

US 2018/0048602 A1    Feb. 15, 2018

(51) Int. Cl.
*H04L 12/58* (2006.01)

(52) U.S. Cl.
CPC ............. *H04L 51/12* (2013.01); *H04L 51/14* (2013.01); *H04L 51/18* (2013.01); *H04L 51/24* (2013.01)

(58) Field of Classification Search
CPC ......... H04L 51/12; H04L 51/14; H04L 51/24; H04L 51/18
(Continued)

(56) References Cited

U.S. PATENT DOCUMENTS

| 5,878,230 A * | 3/1999 | Weber | ...................... H04L 51/02 379/93.24 |
| 6,226,670 B1 * | 5/2001 | Ueno | ...................... H04L 51/14 340/10.1 |

(Continued)

FOREIGN PATENT DOCUMENTS

| JP | H1055322 A | 2/1998 |
| JP | 2000124942 A | 4/2000 |

(Continued)

OTHER PUBLICATIONS

Gray, Alan, and Mads Haahr. "Personalised, Collaborative Spam Filtering." In CEAS. 2004. all pages.*

(Continued)

*Primary Examiner* — George C Neurauter, Jr.
(74) *Attorney, Agent, or Firm* — Aaron N. Pontikos

(57) ABSTRACT

A computer-implemented method includes receiving, by a first mail transfer agent having a first spool, an electronic mail. The computer-implemented method further includes issuing, by the first mail transfer agent, a first unique identifier to be associated with the electronic mail. The computer-implemented method further includes holding the electronic mail in the first spool for a first predetermined period of time. The computer-implemented method further includes transferring the electronic mail from the first spool to a second mail transfer agent having a second spool. The computer-implemented method further includes issuing, by the second mail transfer agent, a second unique identifier to be associated with the electronic mail. The computer-implemented method further includes holding the electronic mail in the second spool for a second predetermined period of time. The computer-implemented method further includes prohibiting a transfer of the electronic mail from the second mail transfer agent to a mail recipient agent.

6 Claims, 6 Drawing Sheets

(58) Field of Classification Search
USPC .................................. 709/203–206, 217, 232
See application file for complete search history.

(56) References Cited

U.S. PATENT DOCUMENTS

| | | | |
|---|---|---|---|
| 6,272,530 B1* | 8/2001 | Horiuchi | H04L 51/24 709/206 |
| 6,310,694 B1* | 10/2001 | Okimoto | G06F 3/1204 358/1.13 |
| 6,721,784 B1* | 4/2004 | Leonard | H04L 51/18 709/204 |
| 7,228,334 B1* | 6/2007 | Jordan, Jr. | H04L 51/14 709/206 |
| 7,275,214 B2 | 9/2007 | Itoh | G06Q 10/107 715/739 |
| 7,512,814 B2 | 3/2009 | Chen et al. | |
| 7,912,908 B2* | 3/2011 | Cai | H04W 4/12 709/206 |
| 8,671,131 B2 | 3/2014 | Collet et al. | |
| 9,130,779 B2* | 9/2015 | Goyal | H04L 51/34 |
| 10,728,199 B2* | 7/2020 | Grochocki, Jr. | H04L 51/14 |
| 2002/0073159 A1* | 6/2002 | Jain | G06Q 10/107 709/206 |
| 2003/0023692 A1* | 1/2003 | Moroo | G06Q 10/107 709/206 |
| 2004/0103160 A1* | 5/2004 | Sheldon | H04L 51/12 709/206 |
| 2005/0223064 A1* | 10/2005 | Salerno | G06Q 10/107 709/206 |
| 2007/0005717 A1* | 1/2007 | LeVasseur | G06F 21/60 709/206 |
| 2010/0057869 A1 | 3/2010 | Stavrou et al. | |
| 2012/0011361 A1* | 1/2012 | Guerrero | G06Q 10/107 713/168 |
| 2015/0256666 A1 | 9/2015 | Peterson | |
| 2017/0118151 A1* | 4/2017 | Cohen | H04L 51/12 |

FOREIGN PATENT DOCUMENTS

| | | | |
|---|---|---|---|
| JP | 2000267954 A | | 9/2000 |
| JP | 2003174481 A | | 6/2003 |
| JP | 2003223399 A | | 8/2003 |
| JP | 2004151783 A | * | 5/2004 |
| JP | 2005277976 A | | 10/2005 |
| JP | 2009164919 A | | 7/2009 |

OTHER PUBLICATIONS

Wes Morgan. "Understanding Email Headers, Part II—The Basics", publicly posted as of Nov. 10, 2012, 3 pages. (Year: 2012).*

Jaime Zawinski. "message threading", publicly posted as of Jan. 1, 2006, 8 pages. (Year: 2006).*

GitHub. "E-mails should appear threaded by using an in-reply-to header", Cyclescape project, originally posted Aug. 11, 2012, 6 pages. (Year: 2012).*

P. P Resnick. "Request for Comments (RFC) 2822: Internet Message Format", Network Working Group, Apr. 2001, 51 pages. (Year: 2001).*

G. Klyne et al. "Request for Comments (RFC) 4021: Registration of Mail and MIME Header Fields", Network Working Group, Mar. 2005, 54 pages. (Year: 2005).*

* cited by examiner

ELECTRONIC MAIL DELIVERY SYSTEM HAVING A SPOOL FUNCTION

BACKGROUND

The present invention relates generally to electronic mail transmission and in particular to an electronic mail delivery system having a spool function.

The simple mail transfer protocol ("SMTP") is generally accepted as the standard means for electronic mail (i.e., "email" or "mail") transmission. Typically, user-level client mail applications use the SMTP only for sending messages to a mail server for relaying. Under the SMTP, an email is submitted by a mail client (i.e., mail user agent ("MUA")) to a mail server (mail submission agent ("MSA")). Next, the MSA delivers the email to a mail transfer agent ("MTA"). The MTA may then transfer the email to any number of subsequent MTA's. Here, each MTA constitutes a separate individual SMTP server. When the final MTA receives the email, the email is transferred to a mail delivery agent ("MDA"), which is a server for storing email until the email is retrieved by a user. Here, email may be retrieved by an end-user application (i.e., email clients), such as the post office protocol ("POP") or the internet message access protocol ("IMAP"). With POP, email is downloaded, stored permanently in a local storage and deleted from the server. On the other hand, with IMAP, email remains on a remote server and is cached or temporarily stored locally when viewed by a user.

SUMMARY

A computer-implemented method includes receiving, by a first mail transfer agent, an electronic mail from a sender. The first mail transfer agent includes a first spool. The computer-implemented method further includes issuing, by the first mail transfer agent, a first unique identifier to be associated with the electronic mail. The computer-implemented method further includes holding the electronic mail in the first spool of the first mail transfer agent for a first predetermined period of time. The computer-implemented method further includes transferring the electronic mail from the first spool of the first mail transfer agent to be received by a second mail transfer agent. The second mail transfer agent includes a second spool. The computer-implemented method further includes issuing, by the second mail transfer agent, a second unique identifier to be associated with the electronic mail. The computer-implemented method further includes holding the electronic mail in the second spool of the second mail transfer agent for a second predetermined period of time. The computer-implemented method further includes prohibiting a transfer of the electronic mail from the second mail transfer agent to a mail recipient agent. A corresponding computer system and computer program product are also disclosed.

DETAILED DESCRIPTION

Regardless of the type of mail retrieval protocol implemented by an email client, the process of the SMTP remains the same. At the very core of the SMTP, outgoing mail is sequentially transferred from one MTA to another, whereby the mail is instantaneously forwarded to an MDA of the mails recipient. Accordingly, due to the speed at which mail is transferred, the inventors have observed and/or recognized that cancelling and prohibiting the transfer of mail already in transit remains problematic.

In an attempt to address the problem associated with cancelling mail, several approaches have been proposed. A first common approach to this problem has been to hold the mail for a specified time on a sender side mail client or a sender side mail server. By doing so, mail may be deleted prior to being sent to a recipient side mail client or a recipient side mail server. However, the inventors have observed and/or recognized that under the first approach, the mail cannot be deleted once the mail has reached a recipient side server. A second common approach has been to encrypt mail, whereby the mail is decrypted through the use of a key. Here, the mail may be rendered unreadable by deleting the key. However, the inventors have observed and/or recognized that under the second approach, deletion of the key is ineffective to delete mail already saved in a decrypted state.

With regard to the problem associated with prohibiting the transfer of mail, a common approach to this problem has been to enable a sender of mail to select a transfer prohibition option prior to sending the mail to a recipient. However, the inventors have observed and/or recognized that under this approach, since the option must be set prior to sending the mail, the sender is unable to prohibit the transfer of the mail already in transit.

Various embodiments of the present invention may address or improve upon some or all of the aforementioned problems or disadvantages, however it will be understood that addressing any particular problem or disadvantage is not a necessary requirement for the practice of all embodiments of the present invention.

Figure 1:
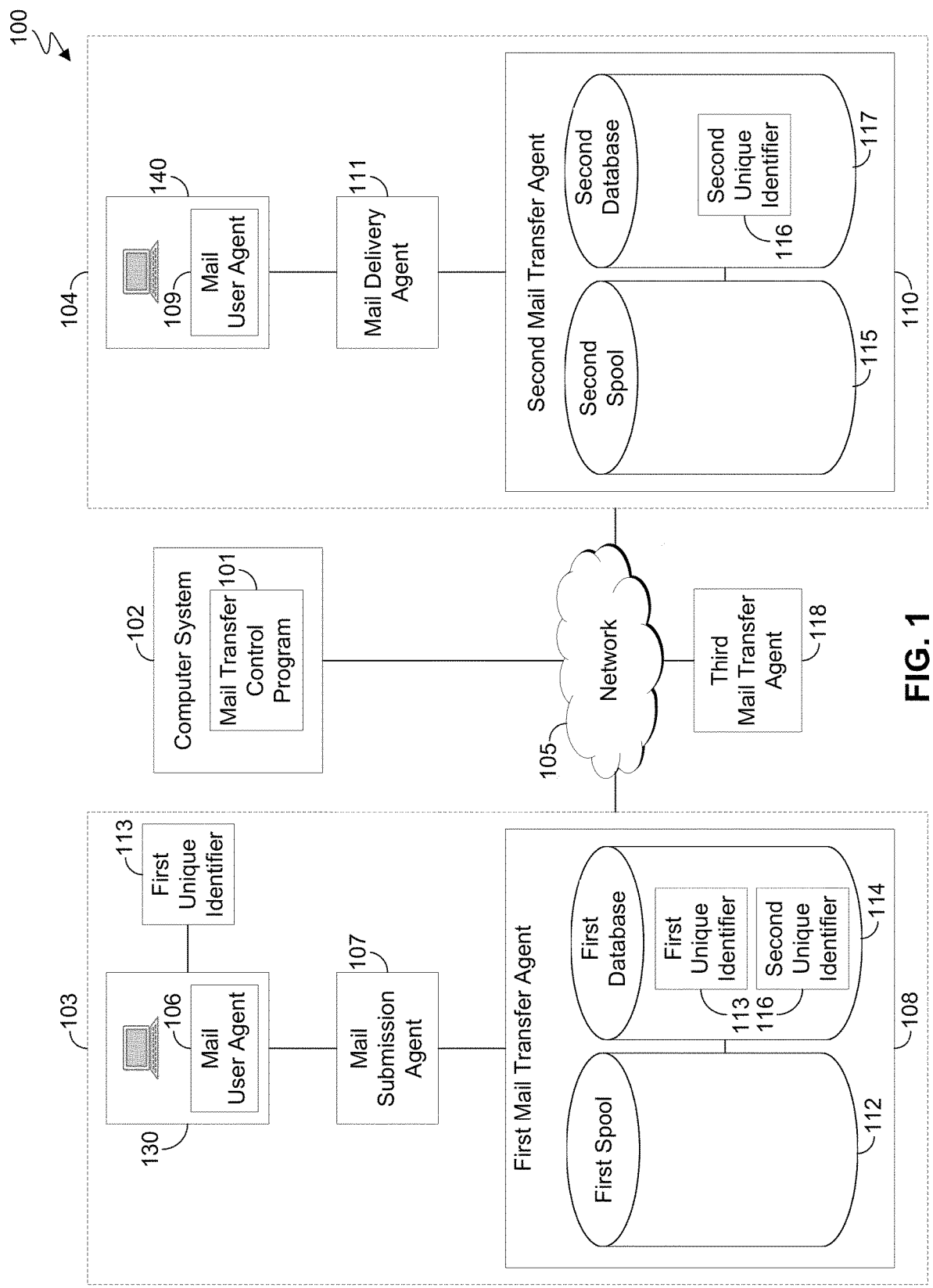
FIG. 1 is a functional block diagram of a computing environment suitable for operation of a mail transfer control program, in accordance with at least one embodiment of the invention.

Referring now to various embodiments of the invention in more detail, FIG. 1 is a functional block diagram of a computing environment, generally designated 100, suitable for operation of a mail transfer control program 101 in accordance with at least one embodiment of the invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes computer system 102, sender system 103 and recipient system 104 interconnected over network 105. Network 105 can be, for example, a telecommunications network, a local area network (LAN), a wide area network (WAN), such as the Internet, or a combination of the three, and can include wired, wireless, or fiber optic connections. Network 105 may include one or more wired and/or wireless networks that are capable of receiving and transmitting data, voice, and/or video signals, including multimedia signals that include voice, data, and video information. In general, network 105 may be any combination of connections and protocols that will support communications between computer system 102, sender system 103, recipient system 104, and other computing devices (not shown) within computing environment 100.

Computer system 102 can be a standalone computing device, a management server, a web server, a mobile computing device, or any other electronic device or computing system capable of receiving, sending, and processing data. In other embodiments, computer system 102 can represent a server computing system utilizing multiple computers as a server system, such as in a cloud computing environment. In an embodiment, computer system 102 represents a computing system utilizing clustered computers and components (e.g., database server computers, application server computers, etc.) that act as a single pool of seamless resources when accessed within computing environment 100. Computer system 102 includes mail transfer control program 101. In an embodiment, computer system 102 and mail transfer control program 101 may be integrated into sender system 103 and/or recipient system 104. In an embodiment of the invention, computer system 102 and mail transfer control program 101 may be remotely located from sender system 103 and/or recipient system 104. Computer system 102 may include internal and external hardware components, as depicted and described in further detail with respect to FIG. 6.

Sender system 103 may generally include an MUA 106 and one or more sender-side mail servers. In an embodiment of the invention, the one or more sender-side mail servers may be SMTP servers. In an embodiment of the invention, the one or more sender-side mail servers may be extended SMTP ("ESMTP") servers. In an embodiment of the invention, the one or more sender-side mail servers may be local mail transfer protocol ("LMTP") servers. More specifically, the one or more sender-side mail servers may include an MSA 107 and a first MTA 108. In an embodiment of the invention, MSA 107 and first MTA 108 are simply different instances of the same software launched with different configurations on the same machine. In an alternative embodiment, MSA 107 and first MTA 108 are different software launched on different machines.

Recipient system 104 may generally include an MUA 109 and one or more recipient-side mail servers. In an embodiment of the invention, the one or more recipient-side mail servers may be SMTP servers. In an embodiment of the invention, the one or more recipient-side mail servers may be ESMTP servers. In an embodiment of the invention, the one or more recipient-side mail servers may be LMTP servers. More specifically, the one or more recipient-side servers may include a second MTA 110 and an MDA 111.

Figure 2:
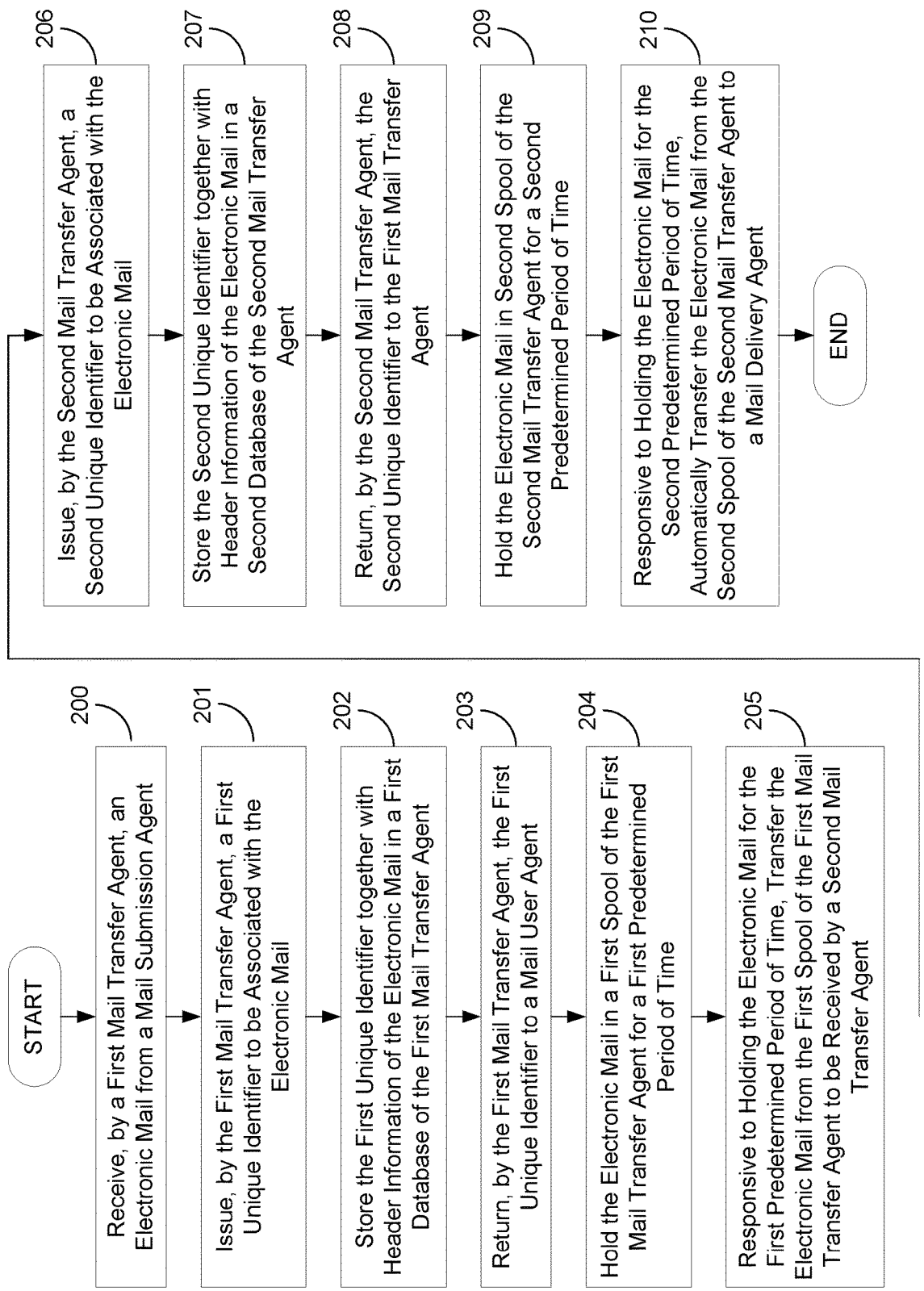
FIG. 2 is a flow chart diagram depicting operational steps for a mail transfer control program, in accordance with at least one embodiment of the invention.

FIG. 2 is a flow chart diagram depicting operational steps for a mail transfer control program 101 in accordance with at least one embodiment of the invention. At step 200, mail transfer control program 101 may receive, by first MTA 108, an electronic mail from MSA 107. More specifically, the electronic mail may be submitted by MUA 106 to MSA 107, which in turn may deliver the electronic mail to first MTA 108. In an embodiment of the invention, MUA 106 may be an email client. In an alternative embodiment of the invention, MUA 106 may be web mail. In either embodiment, an email client or web mail may provide an interface to display and edit text, as well as format the header (e.g., destination fields ("To", "Cc", and "Bcc") and origination fields ("From", "Sender", "In-Reply-To", and "References")) and body of an electronic mail. In an embodiment of the invention, first MTA 108 may include a first spool 112 (i.e., "simultaneous peripheral operations online). A spool may generally be understood as a temporary storage area within an MTA that includes input and/or output data (i.e., electronic mail).

At step 201, mail transfer control program 101 may issue, by first MTA 108, a first unique identifier 113 to be associated with the electronic mail. A unique identifier may generally be understood as a numeric or alphanumeric string issued by an MTA that is associated with a single electronic mail within an SMTP system. At step 202, mail transfer control program 101 may store first unique identifier 113 associated with the electronic mail together with the header information of the electronic mail in a first database 114 of first MTA 108. At step 203, mail transfer control program 101 may return, by first MTA 108, first unique identifier 113 to MUA 106. Here, first MTA 108 may return first unique identifier 113 to MUA 106 by using an extended function (i.e., plug-in function) of the SMTP, such as an ESMTP.

At step 204, mail transfer control program 101 may hold the electronic mail in first spool 112 of first MTA 108 for a first predetermined period of time. At step 205, responsive to holding the electronic mail in first spool 112 for a first predetermined period of time, mail transfer control program 101 may transfer the electronic mail from first spool 112 of first MTA 108 to be received by second MTA 110. In an embodiment of the invention, second MTA 110 may include a second spool 115.

At step 206, mail transfer control program 101 may issue, by second MTA 110, a second unique identifier 116 to be associated with the electronic mail. At step 207, mail transfer control program 101 may store second unique identifier 116 associated with the electronic mail together with header information of the electronic mail in a second database 117 of second MTA 110. At step 208, mail transfer control program 101 may return, by second MTA 110, second unique identifier 116 to first MTA 108. Here, second MTA 110 may return second unique identifier 116 to first MTA 108 by using an extended function (i.e., plug-in function) of the SMTP, such as an ESMTP. Thus, by returning first unique identifier 113 to MUA 106 and second unique identifier 116 to first MTA 108, the location and/or status of a particular electronic mail may be traced by tracking a link between each unique identifier issued by a subsequent MTA.

At step 209, mail transfer control program 101 may hold the electronic mail in second spool 115 of second MTA 110 for a second predetermined period of time. In an embodiment of the invention, at step 210, responsive to holding the electronic mail in second spool 115 of second MTA 110 for a second predetermined period of time, the electronic mail may be automatically transferred to MDA 111, wherein a recipient may be notified of the presence of the electronic mail via MUA 109.

Figure 3:
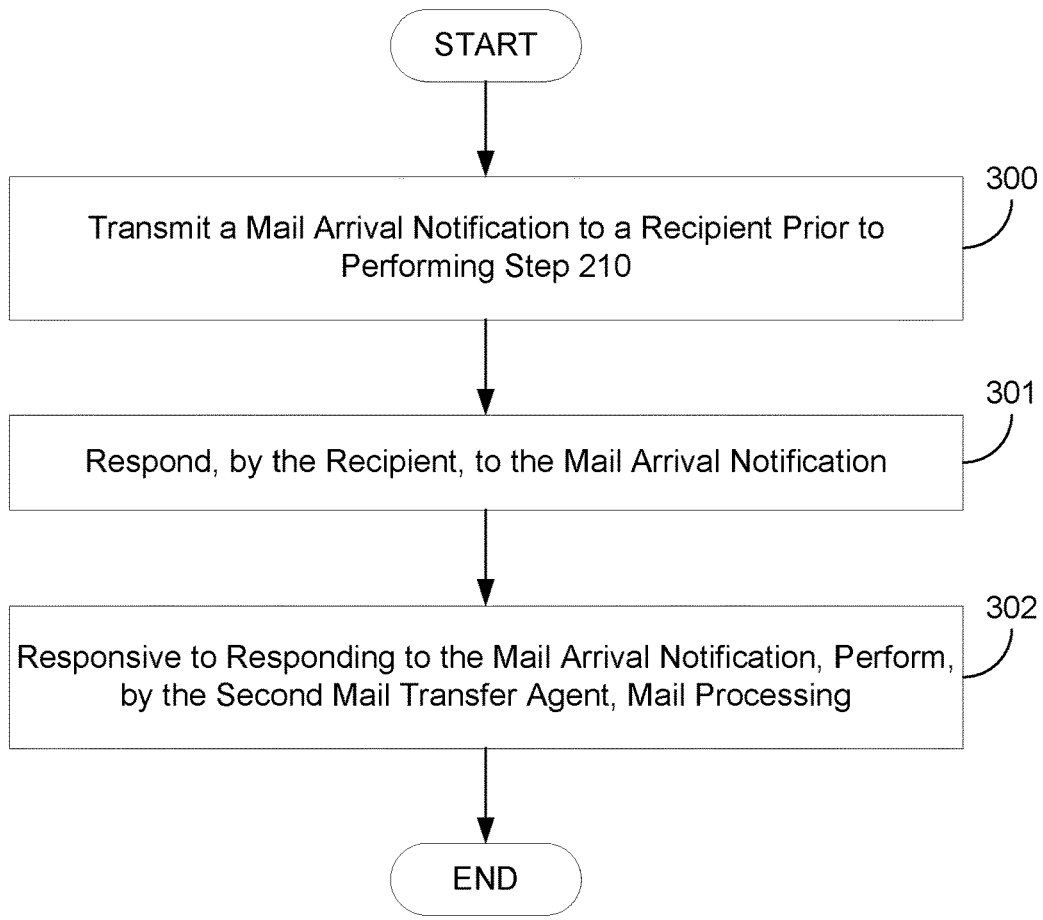
FIG. 3 is a flow chart diagram depicting operational steps for mail processing performed by a mail transfer control program, in accordance with at least one embodiment of the invention.

FIG. 3 is a flow chart diagram depicting operational steps for mail processing performed by a mail transfer control program 101 in accordance with at least one embodiment of the invention. At step 300, prior to performing step 210, mail transfer control program 101 may transmit a mail arrival notification to recipient 140. Mail transfer control program 101 may transmit a mail arrival notification by any generally known messaging protocols, including, but not limited to email, SMS, and push-notification. At step 301, recipient 140 may respond to the mail arrival notification. At step 302, responsive to responding to the mail arrival notification, second MTA 110 may perform mail processing. In an embodiment, mail processing may include deleting the electronic mail from second spool 115 of second MTA 110. In an embodiment, mail processing may include holding the electronic mail in second spool 115 of second MTA 110. In an embodiment, mail processing may include transferring the electronic mail from second spool 115 of second MTA 110 to MDA 111, wherein the electronic mail may be read by recipient 140. By responding to the mail arrival notification, recipient 140 may receive the electronic mail without waiting for the specified period of time allotted for the electronic mail to be held in second spool 115 of second MTA 110. It should be appreciated that the mail arrival notification eliminates the possible transfer of unwanted or infected mail from being transferred and saved in a recipient's mailbox. By adopting the use of a push-notification, quick responses to incoming mails for the recipient may be enhanced. Furthermore, since only the mail address of the sender and headline of the electronic mail may be confirmed from the content of a mail arrival notification, it becomes possible to avoid virus infection caused by downloading electronic mail to a recipient's mailbox.

In embodiments of the invention, sender 130 or a system administrator may dynamically change the holding time of first spool 112 of first MTA 108 and second spool 115 of second MTA 110 for each electronic mail sent from MUA 106. In embodiments of the invention, sender 130 may perform a forced transfer of the electronic mail being held in second spool 115 of second MTA 110 by dynamically changing the holding time of second spool 115 of second MTA 110. In embodiments of the invention, the electronic mail may automatically be cancelled or deleted responsive to the electronic mail being held in second spool 115 of second MTA 110 for the second predetermined period of time.

Figure 4:
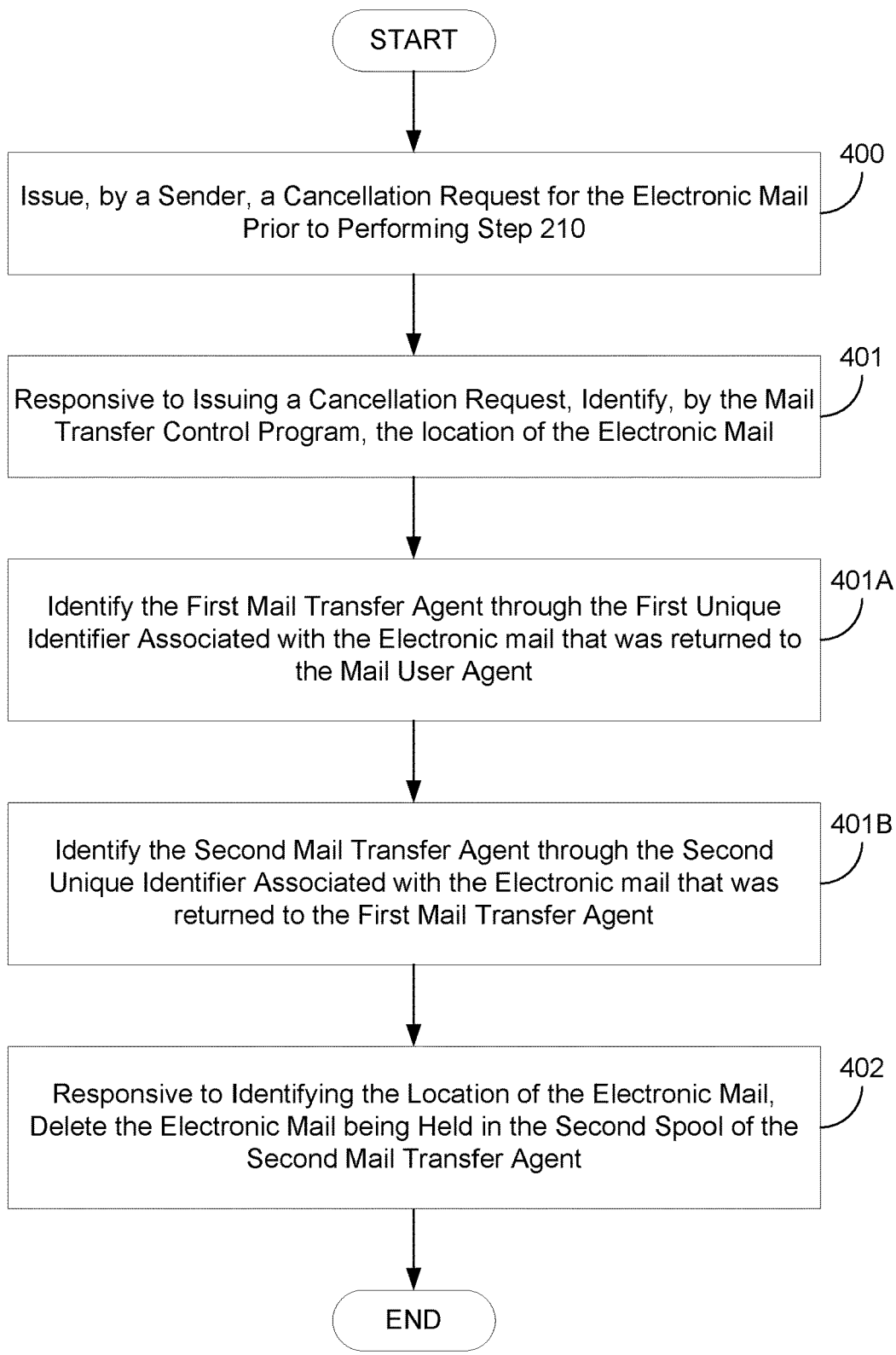
FIG. 4 is a flow chart diagram depicting operational steps for mail cancellation of an electronic mail performed by a mail transfer control program, in accordance with at least one embodiment of the invention.

FIG. 4 is a flow chart diagram depicting operational steps for mail cancellation of an electronic mail performed by a mail transfer control program 101 in accordance with at least one embodiment of the invention. Here, mail cancellation may generally be understood as prohibiting the electronic mail from being transferred to a mail recipient agent (i.e., MDA 111 and/or a third MTA 118). At step 400, prior to performing step 210, sender 130 may prohibit a transfer of the electronic mail from second spool 115 of second MTA 110 to a mail recipient agent by issuing a cancellation request for the electronic mail. At step 401, responsive to issuing a cancellation request, mail transfer control program 101 may identify the location of the electronic mail by tracking a link between each unique identifier issued by each subsequent MTA. At step 401A, mail transfer control program 101 may identify first MTA 108 through first unique identifier 113 associated with the electronic mail that was returned to MUA 106. Similarly, at step 401B, mail transfer control program 101 may identify second MTA 110 through second unique identifier 116 associated with the electronic mail that was returned to first MTA 108. At step 402, responsive to identifying the location of the electronic mail (e.g., second MTA 110), mail transfer control program 101 may cancel or delete the electronic mail being held in second spool 115 of second MTA 110.

Figure 5:
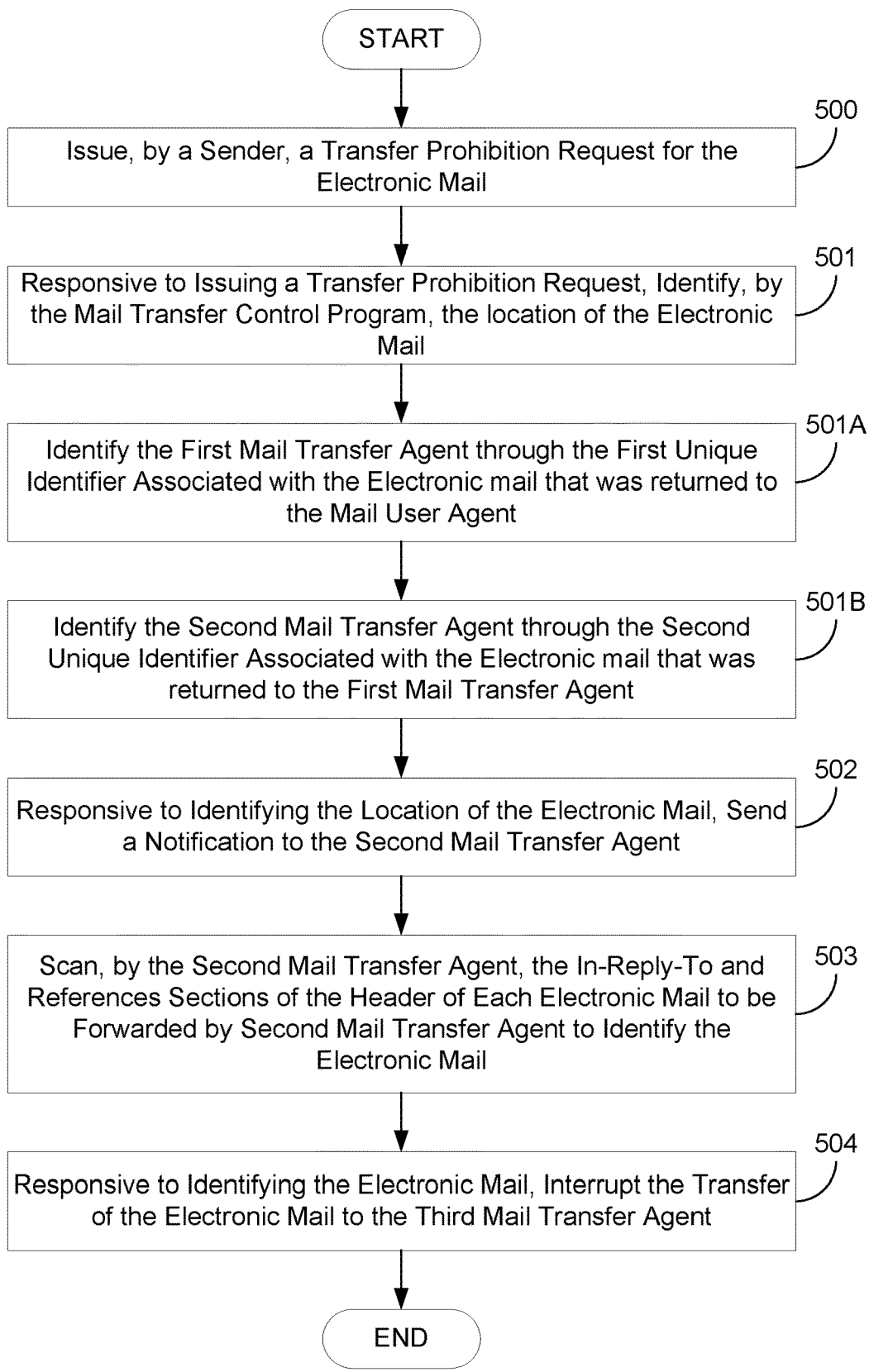
FIG. 5 is a flow chart diagram depicting operational steps for transfer prohibition of an electronic mail performed by a mail transfer control program, in accordance with at least one embodiment of the invention.

FIG. 5 is a flow chart diagram depicting operational steps for transfer prohibition of an electronic mail performed by a mail transfer control program 101 in accordance with at least one embodiment of the invention. Once the electronic mail has been transferred to MDA 111 (step 210), whether automatically or by force transfer, the electronic mail can no longer be cancelled. However, at step 500, sender 130 may prohibit a transfer of the electronic mail from second MTA 110 to third MTA 118 by issuing a request for transfer (i.e., forwarding) prohibition of the electronic mail. Here, a transfer prohibition may generally be understood as prohibiting the electronic mail from being transferred to a third MTA 118. At step 501, responsive to issuing a transfer prohibition request, mail transfer control program 101 may identify the location of the electronic mail by tracking a link between each unique identifier issued by each subsequent MTA. At step 501A, mail transfer control program 101 may identify first MTA 108 through first unique identifier 113 associated with the electronic mail that was returned to MUA 106. Similarly, at step 501B, mail transfer control program 101 may identify second MTA 110 through second unique identifier 116 associated with the electronic mail that was returned to first MTA 108. At step 502, responsive to identifying the location of the electronic mail (e.g., second MTA 110), mail transfer control program 101 may notify second MTA 110 that the electronic mail having a message-ID XXXX1 is prohibited from being forwarded to third MTA 118. At step 503, once notified, second MTA 110 may scan the "In-Reply-To" and "References" sections of the header of each electronic mail to be forwarded. At step 504, responsive to the message-ID corresponding to a transfer prohibition request is identified (message-ID XXXX1), second MTA 110 may interrupt the transfer of the electronic mail (message-ID XXXX1) to third MTA 118.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Some embodiments of the present invention may include one, or more, of the following features, characteristics, operations and/or advantages: (i) a spool being provided on each MTA to hold electronic mail for a specified period of time, so that operations such as mail delivery state (i.e., identifying the location of electronic mail by tracking a link between each unique identifier issued by each subsequent MTA), mail cancellation and mail transfer prohibition may be performed; (ii) a mail arrival notification mechanism which notifies recipients of the presence of electronic mail being held in the spool and which enables the recipients to execute mail processing (e.g., mail reception, retention, and deletion) by responding to the mail arrival notification; (iii) a mail arrival notification mechanism which notifies recipients of the presence of electronic being held in the spool via push-notification, SMS, etc. for mobile phones and allows for a quick response to incoming mail for the recipient; (iv) the ability of a user or system administrator to dynamically change the holding time of each spool and thereby perform operations such as forced transfer of mail and automatic cancellation of unread mail; and/or (v) a new mail transfer system that is applicable to existing mail clients without any particular expanded function.

Some embodiments of the present invention may include one, or more, of the following features, characteristics, operations and/or advantages: (i) holding electronic mail on MTAs within a transfer path, such that mail transmitted onto an external network may be cancelled; (ii) a web service for performing mail cancellation and mail transfer prohibition so that immediacy of cancelling mail or prohibiting the transfer of mail to third parties (i.e., forwarding) may be secured; (iii) a web service configured to share a unique identifier between adjacent MTAs for tracking a mail delivery path; (iv) a web service that maintains high security by only permitting actions such as mail cancellation and mail transfer prohibition to be performed by the original sender of the transmitted mail, thus eliminating the possibility of identity theft by third parties; a mail transfer system for preventing the spread of erroneously transmitted mail by cancelling mail to be transmitted to a recipient and preventing the transfer of mail to third party recipients; (v) a mail transfer prohibition function that may dynamically be initiated by a sender or system administrator at any point in the mail transfer process; (vi) a mail transfer prohibition function that may be used as a countermeasure against various unsolicited mails to prevent the spread of secondary and tertiary damages caused by virus-infected mail, phishing scam mail, junk mail, chain-mail, etc.; (vii) a mail transfer prohibition function that may be initiated by a user or system administrator even after mail has already been read and or transferred to third parties.

Figure 6:
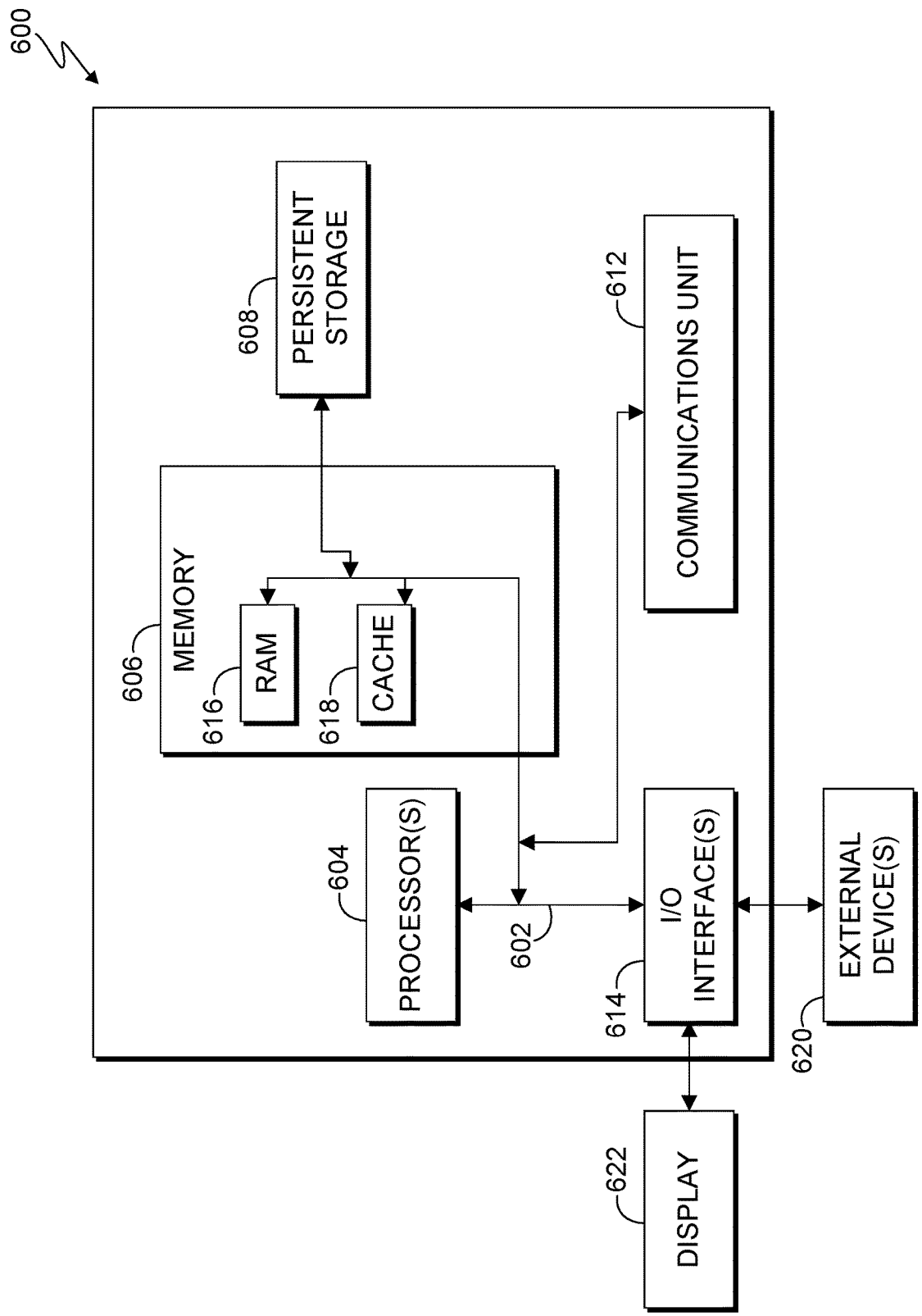
FIG. 6 is a block diagram depicting components of a computer suitable for executing a mail transfer control program, in accordance with at least one embodiment of the invention.

FIG. 6 is a block diagram depicting components of a computer 600 suitable for executing the mail transfer control program 101. FIG. 6 displays the computer 600, the one or more processor(s) 604 (including one or more computer processors), the communications fabric 602, the memory 606, the RAM 616, the cache 618, the persistent storage 608, the communications unit 612, the I/O interfaces 614, the display 622, and the external devices 620. It should be appreciated that FIG. 6 provides only an illustration of one embodiment and does not imply any limitations with regard to the environments in which different embodiments may be implemented. Many modifications to the depicted environment may be made.

As depicted, the computer 600 operates over a communications fabric 602, which provides communications between the computer processor(s) 604, memory 606, persistent storage 608, communications unit 612, and input/output (I/O) interface(s) 614. The communications fabric 602 may be implemented with any architecture suitable for passing data or control information between the processors 604 (e.g., microprocessors, communications processors, and network processors), the memory 606, the external devices 620, and any other hardware components within a system. For example, the communications fabric 602 may be implemented with one or more buses.

The memory 606 and persistent storage 608 are computer readable storage media. In the depicted embodiment, the memory 606 comprises a random access memory (RAM) 616 and a cache 618. In general, the memory 606 may comprise any suitable volatile or non-volatile one or more computer readable storage media.

Program instructions for the mail transfer control program 101 may be stored in the persistent storage 608, or more generally, any computer readable storage media, for execution by one or more of the respective computer processors 604 via one or more memories of the memory 606. The persistent storage 608 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of the persistent storage 608.

The communications unit 612, in these examples, provides for communications with other data processing systems or devices. In these examples, the communications unit 612 may comprise one or more network interface cards. The communications unit 612 may provide communications through the use of either or both physical and wireless communications links. In the context of some embodiments of the present invention, the source of the various input data may be physically remote to the computer 600 such that the input data may be received and the output similarly transmitted via the communications unit 612.

The I/O interface(s) 614 allow for input and output of data with other devices that may operate in conjunction with the computer 600. For example, the I/O interface 614 may provide a connection to the external devices 620, which may be as a keyboard, keypad, a touch screen, or other suitable input devices. External devices 620 may also include portable computer readable storage media, for example thumb drives, portable optical or magnetic disks, and memory cards. Software and data used to practice embodiments of the present invention may be stored on such portable computer readable storage media and may be loaded onto the persistent storage 608 via the I/O interface(s) 614. The I/O interface(s) 614 may similarly connect to a display 622. The display 622 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for transferring electronic mail comprising:
    sending, by a sender-side system, a first electronic mail to a mail user agent of a recipient-side system based, at least in part, on transferring said first electronic mail between a first mail transfer agent acting as a sender-side simple mail transfer protocol server and a second mail transfer agent acting as a recipient-side simple mail transfer protocol server; and
    issuing, by said sender-side system, after receipt of said first electronic mail by said mail user agent of said recipient-side system, a mail transfer prohibition instruction to said second mail transfer agent that includes:
        instructing said second mail transfer agent to scan at least one of an in-reply-to and references section of a header of each electronic mail awaiting forwarding by said second mail transfer agent to identify a message identifier associated with said first electronic mail; and instructing said second mail transfer agent, responsive to identifying said message identifier associated with said first electronic mail in at least one of said in-reply-to and said references section of a header of a second electronic mail stored on said second mail transfer agent, to interrupt forwarding of said second electronic mail between said second mail transfer agent and a mail recipient agent, wherein:
said message identifier is a globally unique identifier assigned to the first electronic message; and
said mail transfer prohibition instruction enables said recipient-side system to retain said first electronic mail subsequent to reception of said mail transfer prohibition instruction.

2. The computer-implemented method of claim 1, wherein said mail recipient agent comprises at least one of a third mail transfer agent acting as a third party recipient-side server and a mail delivery agent acting as a recipient-side server.

3. The computer-implemented method of claim 1, wherein issuing, by said sender-side system, said mail transfer prohibition instruction further comprises:
notifying said second mail transfer agent of said recipient-side system that any electronic mail that includes said message identifier associated with said first electronic mail is prohibited from being forwarded to said mail recipient agent.

4. A computer program product, the computer program product comprising one or more computer readable storage devices and program instructions stored on said one or more computer readable storage devices, said program instructions comprising instructions to cause a processor(s) set to perform the following operations:
send, by a sender-side system, a first electronic mail to a mail user agent of a recipient-side system based, at least in part, on transferring said first electronic mail between a first mail transfer agent acting as a sender-side simple mail transfer protocol server and a second mail transfer agent acting as a recipient-side simple mail transfer protocol server; and
issue, by said sender-side system, after receipt of said first electronic mail by said mail user agent of said recipient-side system, a mail transfer prohibition instruction to said second mail transfer agent that includes:
instructing said second mail transfer agent to scan at least one of an in-reply-to and references section of a header of each electronic mail awaiting forwarding by said second mail transfer agent to identify a message identifier associated with said first electronic mail; and
instructing said second mail transfer agent, responsive to identifying said message identifier associated with said first electronic mail in at least one of said in-reply-to and said references section of a header of a second electronic mail stored on said second mail transfer agent, to interrupt forwarding of said second electronic mail between said second mail transfer agent and a mail recipient agent, wherein:
said message identifier is a globally unique identifier assigned to the first electronic message; and
said mail transfer prohibition instruction enables said recipient-side system to retain said first electronic mail subsequent to reception of said mail transfer prohibition instruction.

5. The computer program product of claim 4, wherein said mail recipient agent comprises at least one of a third mail transfer agent acting as a third party recipient-side server and a mail delivery agent acting as a recipient-side server.

6. The computer program product of claim 4, wherein said program instructions to issue, by said sender-side system, said mail transfer prohibition instruction further comprises:
notifying said second mail transfer agent of said recipient-side system that any electronic mail that includes said message identifier associated with said first electronic mail is prohibited from being forwarded to said mail recipient agent.

\* \* \* \* \*